United States Patent [19]
Krumszyn et al.

[11] Patent Number: 5,443,199
[45] Date of Patent: Aug. 22, 1995

[54] UNIVERSAL CARRIAGE FOR CUTTING AND WELDING

[76] Inventors: Luba M. Krumszyn; Zinovi Khabal, both of 125 The Crossway, Yonkers, N.Y. 10701

[21] Appl. No.: 161,068

[22] Filed: Dec. 3, 1993

[51] Int. Cl.6 .............................................. B23K 37/02
[52] U.S. Cl. ........................................ 228/29; 228/32; 228/45; 266/67; 266/77
[58] Field of Search ............... 228/32, 45, 29; 266/56, 266/67, 77, 70; 104/118; 105/141

[56] References Cited

U.S. PATENT DOCUMENTS

| | | | |
|---|---|---|---|
| 4,260,869 | 4/1981 | Slavens et al. | 228/29 |
| 4,327,898 | 5/1982 | Grant et al. | 266/67 |
| 4,635,839 | 1/1987 | Slavens | 228/29 |

FOREIGN PATENT DOCUMENTS

| | | | |
|---|---|---|---|
| 114881 | 11/1980 | German Dem. Rep. | 228/45 |
| WO88/03456 | 5/1988 | WIPO | 266/67 |

Primary Examiner—Mark Rosenbaum
Assistant Examiner—Jeffrey T. Knapp
Attorney, Agent, or Firm—Charles E. Baxley

[57] ABSTRACT

An apparatus for performance of cutting and welding operations includes an enclosure which encloses a drive motor and which supports a drive wheel and an idler wheel for driving the enclosure along a track. A first support rod projects from the enclosure and a second support rod is adjustably mounted on the first support rod. A torch for cutting and welding is adjustably mounted on the second support rod and a variety of linear and curved tracks are provided, thereby facilitating performances of cutting and welding operations on a range of workpiece configurations.

17 Claims, 5 Drawing Sheets

5,443,199

UNIVERSAL CARRIAGE FOR CUTTING AND WELDING

BACKGROUND OF THE INVENTION

This invention relates generally to the field of automated welding apparatus and more particularly to a universal carriage for cutting and welding which can follow an easily positionable flexible track.

The prior art related to the field of automated welding apparatus includes various examples of complex computer operated robotic equipment which can be programmed to perform various repetitive welding operations. There remains a need however for a simple light-weight cutting and welding apparatus which can be easily set up to perform a cutting or a welding operation and then can be easily moved either to another part of the factory or to a remote job site to perform a different cutting or welding operation.

OBJECTS AND SUMMARY OF THE INVENTION

It is an object of the present invention to provide a universal carriage for cutting and welding which can be easily set up to follow a flexible track in order to perform a cutting or welding operation.

Another object of the present invention is to provide a universal carriage for cutting and welding which can be easily moved and set up at a job site.

Another object of the present invention is to provide a universal carriage for cutting and welding which incorporates a track which can be easily attached to the work piece using permanent magnets.

Another object of the present invention is to provide a universal carriage for cutting and welding which can provide both straight and contoured welds.

Another object of the present invention is to provide a universal carriage for cutting and welding which is capable of welding large structures in an automated manner.

Another object of the present invention is to provide a universal carriage for cutting and welding which provides accurate control of the path of the cutting or welding process.

Yet another object of the present invention is to provide a universal carriage for cutting and welding which includes a relatively small number of component parts resulting in reliable long term operation.

In accordance with the present invention, there is provided a universal carriage for cutting and welding which includes an enclosure within which an electric drive motor is mounted and which supports a drive wheel and an idler wheel for driving the enclosure along a track. A first support rod projects from the enclosure and a second support rod is adjustably mounted on the first support rod. A torch is adjustably mounted on the second support rod, thereby providing a range of flexibility in the positioning of the torch.

The drive wheel and the idler wheel bear on opposite edges of a track which is provided with the apparatus and the motor drives the enclosure along the track, thereby moving the torch in a predetermined pattern. A variety of track configurations are provided including linear, circular and cylindrical tracks for performance of cutting and welding operations on a range of workpiece configurations. The tracks are generally flexible and may be attached to the workpiece by a plurality of magnets or a plurality of clamps.

DESCRIPTION OF THE DRAWINGS

Other important objects and advantages of the present invention will be apparent from the following detailed description taken in conjunction with the accompanying drawings in which.

DETAILED DESCRIPTION OF THE INVENTION

Figure 1:
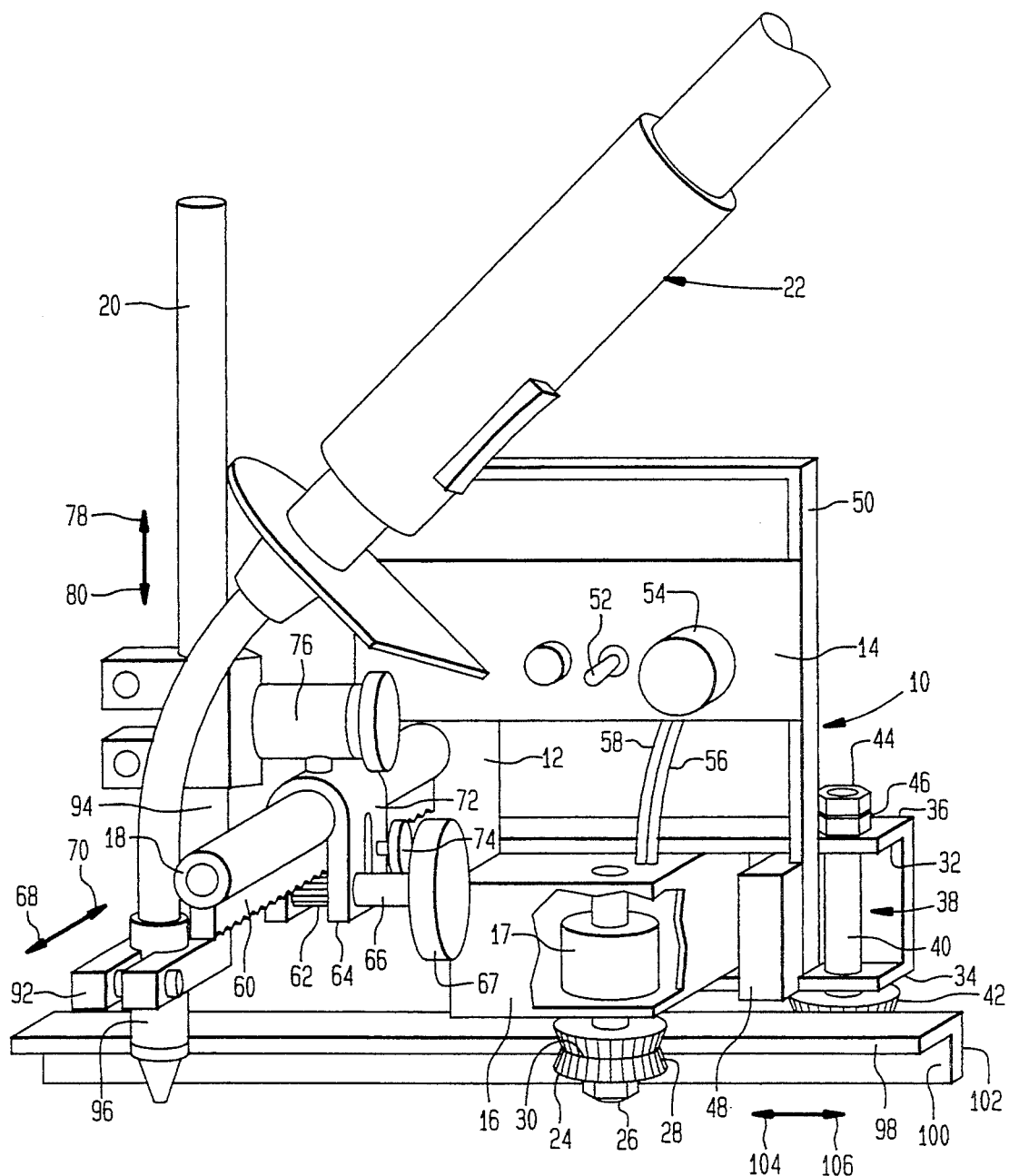
FIG. 1 is a perspective view of a universal carriage for cutting and welding made in accordance with the present invention with the apparatus shown mounted on a straight track.

With reference to the drawings, there is shown in FIG. 1 a universal carriage for cutting and welding which is made in accordance with the present invention and which includes: a body member 12 which is mounted between a control panel 14 and a drive housing 16, a first support rod 18 and a second support rod 20 and a torch assembly 22.

The drive housing 16 encloses a drive motor 17, and which drives a drive wheel 24 which is mounted on a shaft 26.

The drive wheel 24 has a pair of conically shaped drive surfaces 28, 30 which are grooved or serrated to form a non-slip drive surface.

The drive housing 16 is mounted between the flanges 32, 34 of a support channel 36 which includes an idler wheel assembly 38, which is shown in FIG. 1 as including a shaft 40 which is mounted between the flanges 32, 34, an idler wheel 42, rotatably mounted on the shaft 40, and a pair of nuts 44, 46 which lock the shaft 40 to the flange 32.

A support bracket 48 projects from the support channel 36 and supports the bracket 50 and the control panel 14. The control panel 14 includes an on-off switch 52 and a speed control knob 54. The control panel 14 is connected electrically to the drive housing 16 by means of wires 56, 58.

The first support rod 18 projects from the body member 12 in a generally horizontal manner, when viewed as in FIG. 1, and the first support rod 18 includes a rack member 60 which is in mesh with a pinion gear 62 which is mounted on an adapter 64.

The pinion gear 62 is connected to a shaft 66 and a knob 67 which permits adjustment of the position of the adapter 64 in the directions shown by the arrows 68, 70 in FIG. 1.

The adapter 64 includes a clamp portion 72 and a clamp knob 74 which permit the adapter 64 to be clamped to the first support rod 18 after the adjustment of the position of the adapter 64 has been completed. The adapter 64 includes a support portion 76 which supports and clamps the second support rod 20 in a generally vertical orientation when viewed as in FIG. 1.

Figure 2:
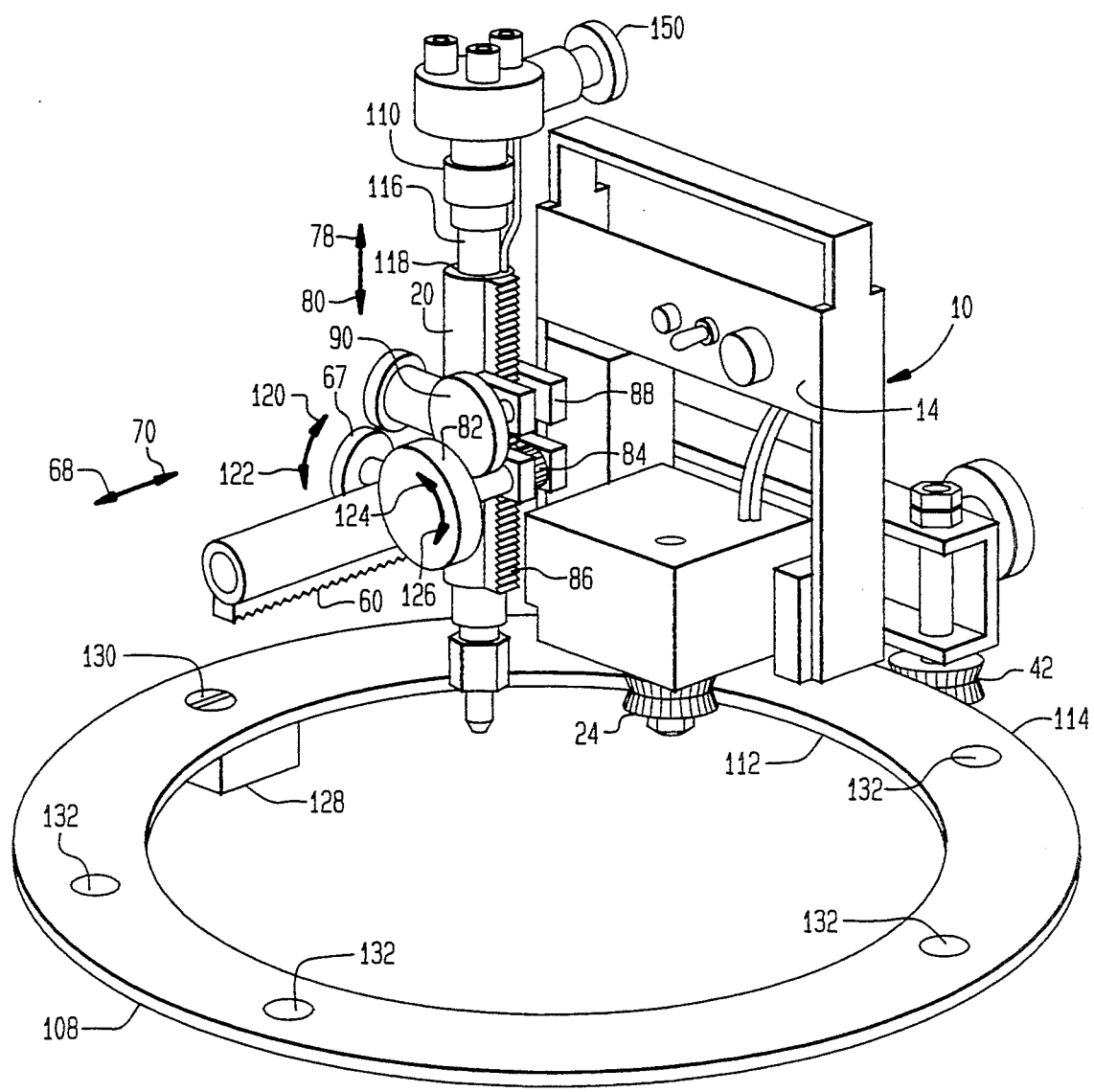
FIG. 2 is a perspective view of the apparatus of FIG. 1, with the apparatus shown mounted on a circular track.

The position of the second support rod 20 relative to the adapter 64 may be adjusted in the directions shown by the arrows 78, 80 using the knob 82 which is connected to the pinion gear which is in mesh with the rack 86 as is best shown in FIG. 2.

The second support rod 20 may be clamped to the adapter 64 when the adjustment has been completed by means of the clamp 88 and the clamp knob 90.

A torch clamp 92 is mounted on the lower end 94 of the second support rod 20 and the nozzle portion 96 of the torch assembly 22 is held by the torch clamp 92.

As is shown in FIG. 1, the drive wheel 24 bears against the edge 98 of the angle member 100 while the idler wheel 42 bears against the vertical flange 102 of the angle member 100. Rotation of the drive wheel 24 drives the apparatus 10 along the angle member 100 in the directions shown by the arrows 104, 106 in FIG. 1.

The support rods 18, 20 allow the position of the nozzle 96 of the torch assembly 22 to be adjusted in a convenient manner thereby allowing the torch assembly 22 to perform an accurate cutting or welding operation while being driven along the angle member in the directions shown by the arrows 104, 106 in FIG. 1.

FIG. 2 shows the apparatus 10 mounted on a circular track 108 which enables the torch 110 to perform circular cutting or welding operations. In a manner similar to that which has been described in connection with FIG. 1, the drive wheel 24 bears against the inner surface 112 of the track 108 and drives the apparatus 10 while the idler wheel 42 bears against the outer surface 114 of the track 108. FIG. 2 shows the torch tube 116 passing through the hollow center portion 118 of the second support rod 20. The position of the second support rod 20 may be adjusted as shown by the arrows 78, 80 and 68, 70 in FIG. 2 by means of the adjustment knobs 67, 82 which may be rotated in the directions shown by the arrows 120, 122, 124, 126 and the racks 60, 86 and pinion gears 62, 84, a previously described in connection with FIG. 1.

The clamp knob 90 may be used to lock the vertical position of the second support rod 20 once the desired adjustment has been made.

Figure 3:
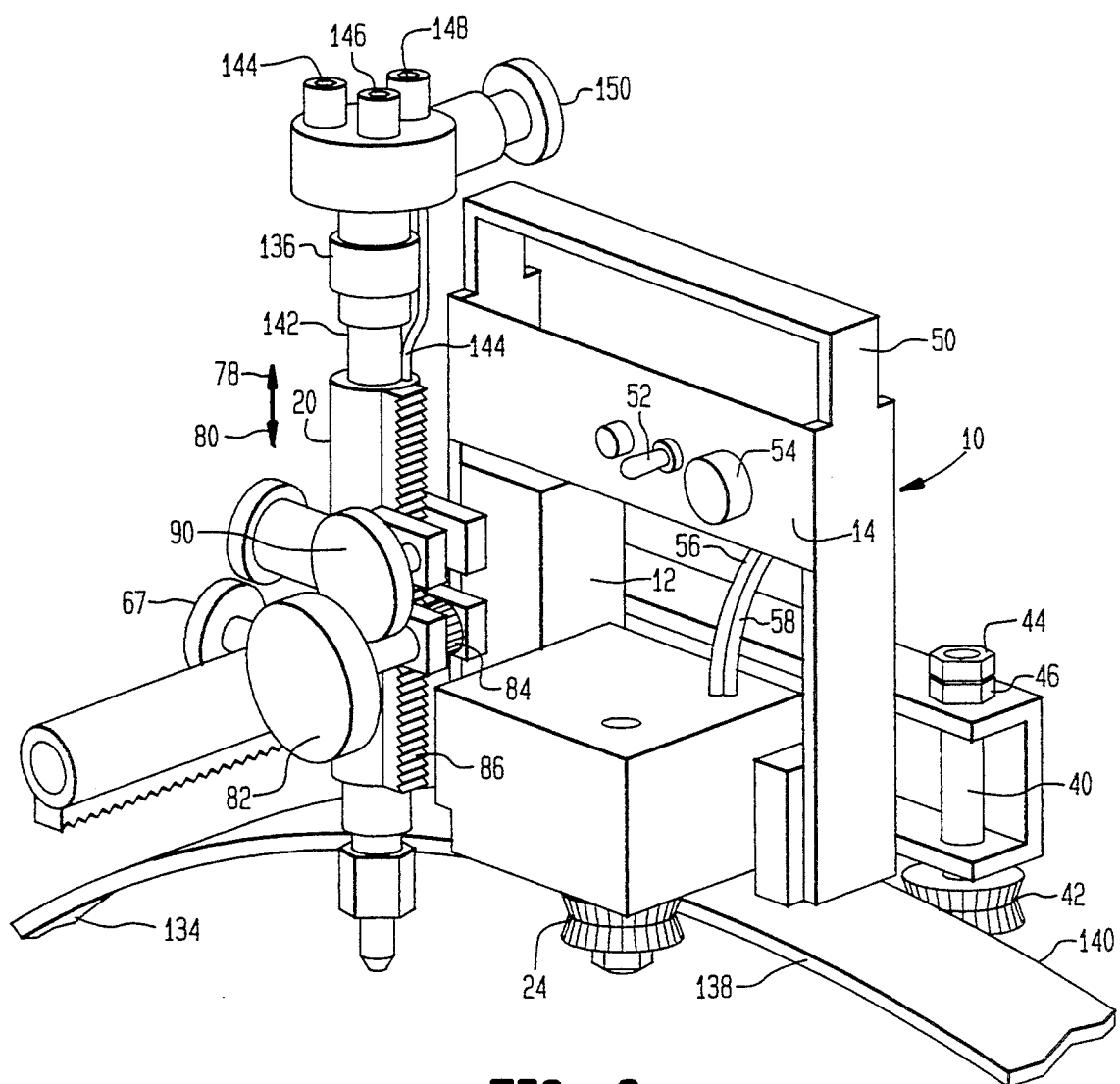
FIG. 3 is a perspective view of the apparatus of FIG. 1, with the apparatus shown mounted on a cylindrical track.

The circular track 108 may be attached to a workpiece by a plurality of magnets, one of which is shown in FIG. 3 and is identified by reference numeral 128. The magnet 128 is attached to the circular track 108 by a screw 130. Additional magnets are attached to the circular track 108 by additional screws which pass through the holes 132.

FIG. 3 shows the apparatus 10 adapted for motion along a cylindrical track 134 which enables the torch 136 to perform cutting or welding operations on cylindrical or tubular structures. In the manner which has been previously described, the drive wheel 24 bears against the first edge 138 of the track 134 while the idler wheel 42 bears against the second edge 140 of the track 134.

The vertical position of the hollow second support rod 20 through which the torch tubes 142, 144 pass may be adjusted as shown by the arrows 78, 80 in FIG. 3 by means of the adjustment knob 82 and the rack 86 and pinion 84 which have been described previously. The clamp knob 90 may be used to lock the vertical position of the second support rod 20 once the desired adjustment has been made as previously described in connection with FIG. 2.

The horizontal position of the torch 186 may be adjusted by means of the adjustment knob 67 as previously described.

FIG. 3 shows the connecting ports 144, 146, 148 for connection of the torch 136 to a variety of gases for performance of cutting or welding operations. The flow of those gases may be controlled by the control knob 150.

Figure 4:
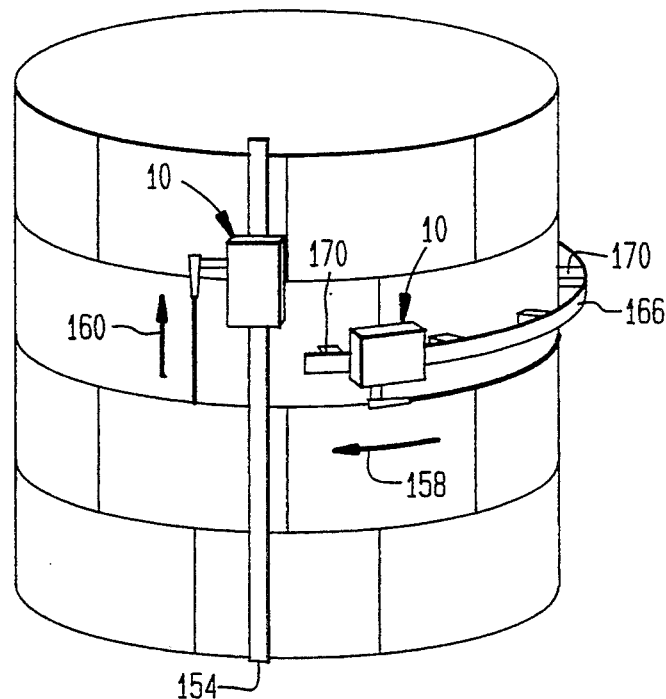
FIG. 4 is a perspective view of two units of the apparatus of FIG. 1 with the apparatus shown performing horizontal and vertical welding operations on a cylindrical tank.

FIGS. 4–8 show the apparatus 10 according to the present invention in use performing various cutting and welding operations. FIG. 4 shows welding operations being performed by two individual units of the apparatus 10, each of which is configured generally as is shown in FIG. 1 during the construction of a large tank 152. The tank 152 shown in FIG. 4 for example may have a diameter in the order of 20 meters. The apparatus 10 travels along the vertical track 154 while performing vertical welds on the tank 152 while a second unit of the apparatus 10 travels along the curved horizontal track 158 on the outer circumference of the tank 152 while performing a circumferential weld. The directions of travel of the apparatus 10 is shown by the arrows 158, 160.

Figure 5:
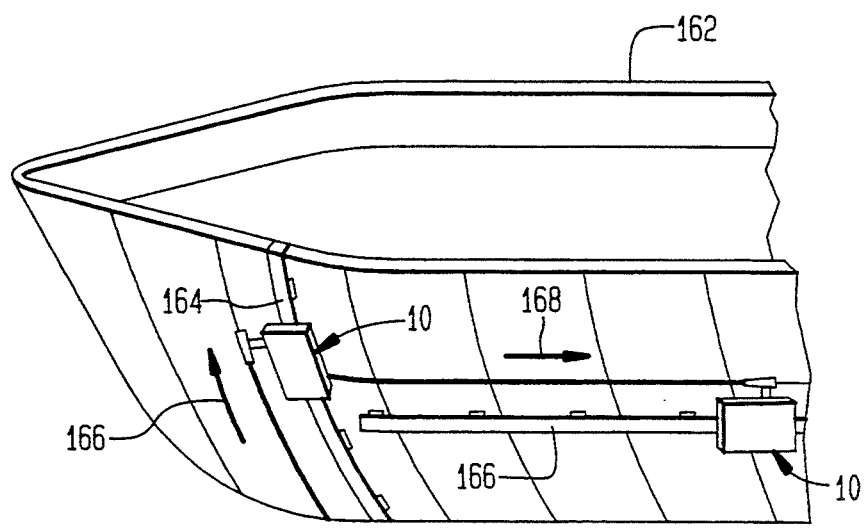
FIG. 5 is a perspective view of two units of the apparatus of FIG. 1 with the apparatus shown performing horizontal and vertical welding operations on an oval tank.

FIG. 5 shows the apparatus 10 in use during the welding of an oval tank 162. In a manner similar to that which has been described above, a first unit of the apparatus 10 travels along a generally vertical track 164 which the second unit of the apparatus 10 travels along a generally horizontal circumferential track 166. This direction of travel of the apparatus is shown by the arrows 166, 168 in FIG. 5.

In each of the FIGS. 4–8, the various tracks are preferably attached to the structures being welded by means of a plurality of magnets 170. In other applications, it may be advantageous to substitute a plurality of clamps for the magnets 170.

Figure 6:
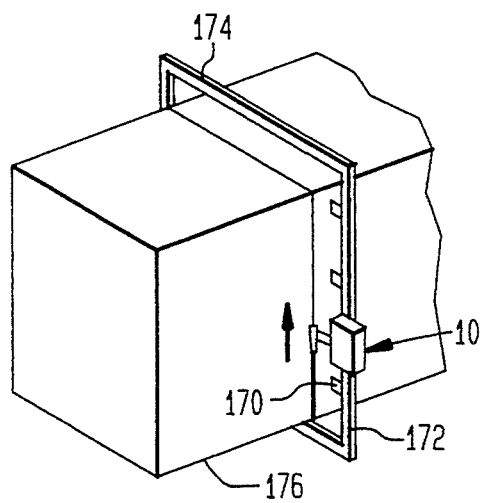
FIG. 6 is a perspective view of the apparatus of FIG. 1, with the apparatus shown performing a welding operation on a rectangular tank.

FIG. 6 shows the apparatus 10 traveling along the straight tracks 172, 174 while performing welding operations on a rectangular enclosure 176.

Figure 7:
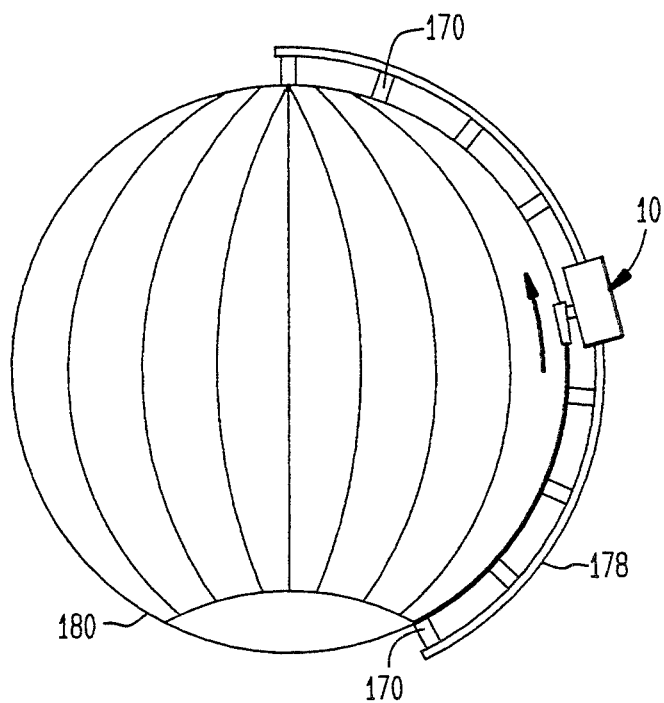
FIG. 7 is a perspective view of the apparatus of FIG. 1 with the apparatus shown performing a welding operation on a spherical tank.

FIG. 7 shows the apparatus 10 traveling along a curved track 178 during the welding of a large spherical tank 180.

Figure 8:
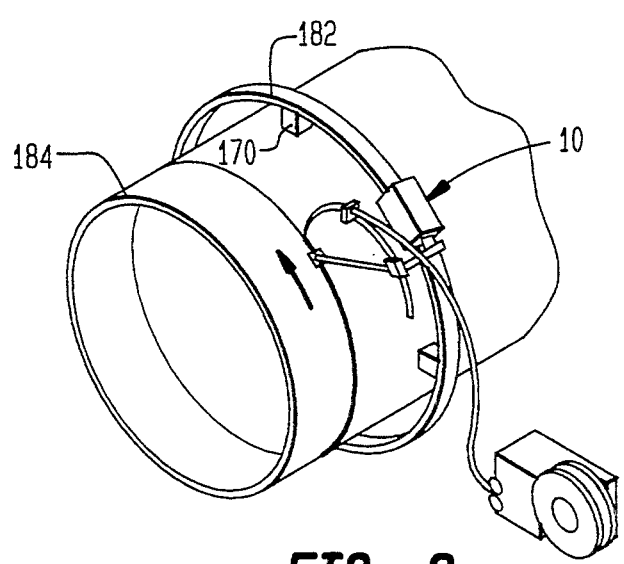
FIG. 8 is a perspective view of the apparatus of FIG. 1 with the apparatus shown performing a cutting operation on a tubular member.

FIG. 8 shows the apparatus 10 traveling along a curved track 182 which is generally similar to the track 138, which is shown in FIG. 3, while performing a cutting operation on a cylindrical tube 184.

In each of the FIGS. 4–8, the various tracks are preferably attached to the structure being welded or cut by a plurality of magnets each of which is identified typically by the numeral 170.

The relatively large sizes of the various structures being welded by the apparatus as shown in the various FIGS. 4–8 indicates a key advantage of the present invention. The diameter of the cylindrical tank 152 in FIG. 4 and the spherical tank 180 in FIG. 7 each may be in the order of 20 meters. The height of the oval tank 102 shown being welded in FIG. 5 may also be in the order of 20 meters. In each of those cases, the welding operation is performed automatically using the apparatus 10 according to the present invention without a need to erect complex and costly scaffolds and ladders for welding by human operators.

The foregoing specific embodiment of the present invention as set forth in the specification is for illustrative purposes only. Various changes may be made within the spirit and scope of this invention.

We claim:

1. A universal carriage apparatus for cutting and welding comprising:
    an enclosure;
    motor means, with said motor means mounted in said enclosure;
    a drive wheel rotatably mounted on said enclosure;
    an idler wheel rotatably mounted on said enclosure;
    driving connection means connecting said motor means and said drive wheel;
    adjustable torch support means mounted on said enclosure and including a pair of support rods with a first of said pair of support rods projecting from said enclosure;
    adjustment means adjustably mounted on said first support rod and with said adjustment means supporting said second support rod;
    torch mounting means disposed on said second support rod;
    track means disposed between said drive wheel and said idler wheel, with said track means having at least one edge portion, with said drive wheel having an axis of rotation, and with said idler wheel having an axis of rotation, with said axis of rotation of said drive wheel generally parallel to said axis of rotation of said idler wheel, and with said drive wheel and said idler wheel each having a pair of conical surfaces and with said drive wheel engaging said edge portion of said track means, thereby enabling said motor means to drive said enclosure along said track means.

2. An apparatus according to claim 1, in which said torch support means comprises a torch mounting clamp.

3. An apparatus according to claim 1, in which said second support rod comprises a hollow portion proportioned to accommodate a torch.

4. An apparatus according to claim 1, in which said drive wheel comprises a serrated drive surface with said serrated drive surface disposed in contact with said track means.

5. An apparatus according to claim 1, in which said track means comprises an elongated linear member.

6. An apparatus according to claim 1, in which said track means comprises an elongated linear member with said member having a pair of flange portions.

7. An apparatus according to claim 1, in which said track means is circular.

8. An apparatus according to claim 1, in which said track means is cylindrical.

9. An apparatus according to claim 1, in which said apparatus further comprises motor control means mounted on said enclosure.

10. An apparatus according to claim 1, in which said motor control means comprises speed control means for control of the speed at which said enclosure is driven along said track means.

11. An apparatus according to claim 1, further comprising first rack means mounted on said first support rod and second rack means mounted on said second support rod and first and second pinion means in mesh with said first and second rack means with said first and second pinion means mounted on said adjustment means.

12. An apparatus according to claim 1, in which said adjustment means further comprises clamp means for locking the position of said first and second support rods.

13. An apparatus according to claim 1, in which said track means comprises a flexible member.

14. An apparatus according to claim 1, in which said pinion means comprises a pair of pinion gears.

15. An apparatus according to claim 1, further comprising attachment means for attachment of said track means to a work piece.

16. An apparatus according to claim 15, in which said attachment means comprises a plurality of clamp means.

17. An apparatus according to claim 15, in which said attachment means comprises a plurality of magnets.

* * * * *